(12) United States Patent
    Sharifi et al.

(10) Patent No.: US 9,031,840 B2
(45) Date of Patent: May 12, 2015

(54) IDENTIFYING MEDIA CONTENT

(71) Applicant: Google Inc., Mountain View, CA (US)

(72) Inventors: Matthew Sharifi, Santa Clara, CA (US);
    Gheorghe Postelnicu, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/142,042

(22) Filed: Dec. 27, 2013

(65) Prior Publication Data

US 2014/0114659 A1    Apr. 24, 2014

Related U.S. Application Data

(63) Continuation of application No. 13/768,232, filed on Feb. 15, 2013, now Pat. No. 8,655,657, which is a continuation of application No. 13/626,351, filed on Sep. 25, 2012, now Pat. No. 8,484,017.

(60) Provisional application No. 61/698,949, filed on Sep. 10, 2012.

(51) Int. Cl.

| | |
|---|---|
| *G10L 15/00* | (2013.01) |
| *G10L 15/26* | (2006.01) |
| *G10L 19/00* | (2013.01) |
| *G10L 25/54* | (2013.01) |
| *G06F 17/30* | (2006.01) |

(52) U.S. Cl.
    CPC .............. *G10L 15/265* (2013.01); *G10L 15/00* (2013.01); *G10L 19/00* (2013.01); *G10H 2210/031* (2013.01); *G10L 25/54* (2013.01); *G06F 17/30746* (2013.01)

(58) Field of Classification Search
    USPC ......... 704/231, 270, 275, 277, 257, 251, 240, 704/235, 233, 226, 222, 205; 725/133; 705/14.73; 379/114.14; 715/206
    See application file for complete search history.

(56) References Cited

U.S. PATENT DOCUMENTS

| | | | | |
|---|---|---|---|---|
| 5,970,446 | A  * | 10/1999 | Goldberg et al. | ............. 704/233 |
| 6,012,030 | A    | 1/2000  | French |  |
| 6,185,527 | B1 * | 2/2001  | Petkovic et al. | ............. 704/231 |
| 6,269,331 | B1 * | 7/2001  | Alanara et al. | ................ 704/205 |
| 6,785,670 | B1   | 8/2004  | Chiang |  |
| 6,876,966 | B1   | 4/2005  | Deng |  |
| 6,990,443 | B1 * | 1/2006  | Abe et al. | ...................... 704/222 |
| 7,257,532 | B2   | 8/2007  | Toyama |  |

(Continued)

OTHER PUBLICATIONS

Costello, Sam, "Using iPhone Voice Control with Music," About.com, retrieved on May 29, 2012 from <http://ipod.about.com/od/iphone3gs/qt/voice-control-music.htm>, 2 pages.

(Continued)

*Primary Examiner* — Michael Colucci
(74) *Attorney, Agent, or Firm* — Fish & Richardson P.C.

(57) ABSTRACT

Methods, systems, and apparatus, including computer programs encoded on a computer storage medium, for receiving (i) audio data that encodes a spoken natural language query, and (ii) environmental audio data, obtaining a transcription of the spoken natural language query, determining a particular content type associated with one or more keywords in the transcription, providing at least a portion of the environmental audio data to a content recognition engine, and identifying a content item that has been output by the content recognition engine, and that matches the particular content type.

15 Claims, 5 Drawing Sheets

(56) References Cited

U.S. PATENT DOCUMENTS

| | | | |
|---|---|---|---|
| 7,386,105 B2* | 6/2008 | Wasserblat et al. ...... 379/114.14 |
| 7,444,353 B1 | 10/2008 | Chen |
| 7,562,392 B1 | 7/2009 | Rhoads |
| 7,788,095 B2* | 8/2010 | Wasserblant et al. ......... 704/251 |
| 7,945,653 B2 | 5/2011 | Zuckerberg |
| 8,438,163 B1 | 5/2013 | Li |
| 2001/0041328 A1 | 11/2001 | Fisher |
| 2004/0054541 A1* | 3/2004 | Kryze et al. .................. 704/275 |
| 2004/0138882 A1 | 7/2004 | Miyazawa |
| 2004/0193426 A1* | 9/2004 | Maddux et al. ............... 704/275 |
| 2004/0230420 A1 | 11/2004 | Kadambe |
| 2005/0071157 A1 | 3/2005 | Droppo |
| 2005/0075881 A1* | 4/2005 | Rigazio et al. ................. 704/270 |
| 2005/0131688 A1* | 6/2005 | Goronzy et al. .............. 704/240 |
| 2005/0144013 A1* | 6/2005 | Fujimoto et al. .............. 704/277 |
| 2005/0187763 A1 | 8/2005 | Arun |
| 2006/0041926 A1* | 2/2006 | Istvan et al. ................... 725/133 |
| 2006/0247927 A1 | 11/2006 | Robbins |
| 2007/0010992 A1 | 1/2007 | Hon |
| 2007/0160345 A1 | 7/2007 | Sakai |
| 2007/0168191 A1* | 7/2007 | Bodin et al. .................. 704/257 |
| 2007/0168335 A1 | 7/2007 | Moore |
| 2007/0208561 A1* | 9/2007 | Choi et al. .................... 704/231 |
| 2008/0226119 A1 | 9/2008 | Candelore |
| 2008/0256033 A1 | 10/2008 | Cheng |
| 2009/0030698 A1* | 1/2009 | Cerra et al. ................... 704/275 |
| 2009/0157523 A1 | 6/2009 | Jones |
| 2009/0240668 A1 | 9/2009 | Li |
| 2009/0271188 A1 | 10/2009 | Agapi |
| 2009/0276219 A1 | 11/2009 | Yeh |
| 2010/0223056 A1 | 9/2010 | Kadirkamanathan |
| 2011/0208518 A1* | 8/2011 | Holtel et al. .................. 704/226 |
| 2012/0010884 A1* | 1/2012 | Kocks et al. .................. 704/240 |
| 2012/0029917 A1* | 2/2012 | Chang et al. ................. 704/235 |
| 2012/0084312 A1 | 4/2012 | Jenson |
| 2012/0179557 A1* | 7/2012 | Gross ......................... 705/14.73 |
| 2013/0013991 A1* | 1/2013 | Evans ........................... 715/206 |

OTHER PUBLICATIONS

CodeInSpot, "Is there a list of possible voice commands anywhere?", May 19, 2012, retrieved from <http://webcache.googleusercontent.com/search?q=cache:kBXLkwFEmREJ:s176.codeinspot.com/q/2430549+&cd=2&hl=en&ct=clnk&gl=us>, 3 pages.

Flood, Stephen, "Speech Recognition and its Development, Applications, and Competition in the Typical Home: A Survey," Dec. 10, 2010, retrieved from <http://www.cs.uni.edu/~schafer/courses/previous/161/Fall2010/proceedings/papers/paperD.pdf>, 7 pages.

Moore, Quentin, "Full list of Siri Commands (Updated with new Siri iOS6 Commands)," WindowsTabletTv, Dec. 12, 2011, retrieved from <http://www.windowstablettv.com/iphone/809-full-list-siri-commands/>, 13 pages.

European Search Report for Application No. 13162403.3, dated Jul. 2, 2013, 6 pages.

Authorized Officer Angelique Vivien, International Search Report and the Written Opinion for Application No. PCT/US2013/035095, dated Jul. 4, 2013, 7 pages.

* cited by examiner

IDENTIFYING MEDIA CONTENT

CROSS-REFERENCE TO RELATED APPLICATIONS

This application is a continuation of U.S. application Ser. No. 13/768,232, filed on Feb. 15, 2013, which is a continuation of U.S. Pat. No. 8,484,017, issued on Jul. 9, 2013, which in turn claims the benefit of U.S. Provisional Patent Application No. 61/698,949, filed Sep. 10, 2012, the entire contents of the previous applications are hereby incorporated by reference.

FIELD

The present specification relates to identifying items of media content and, more specifically, to using keywords in spoken natural language queries to disambiguate the results of an audio fingerprint-based content recognition.

BACKGROUND

Audio fingerprinting provides the ability to link short, unlabeled, snippets of audio content to corresponding data about that content. Audio fingerprinting also provides the ability to automatically identify and cross-link background audio, such as songs.

SUMMARY

According to some innovative aspects of the subject matter described in this specification, an item of media content is identified based on environmental audio data and a spoken natural language query. For example, a user may ask a question about a television program that they are viewing, such as "what are we watching right now?" The question may include keywords, such as "watching," that suggest that the question is about a television show and not some other type of media content. The user's mobile device detects the user's utterance and environmental data, which may include the soundtrack audio of the television program. The mobile computing device encodes the utterance and the environmental data as waveform data, and provides the waveform data to a server-based computing environment.

The computing environment separates the utterance from the environmental data of the waveform data, and then processes the utterance to obtain a transcription of the utterance. From the transcription, the computing environment detects any content type-specific keywords, such as the keyword "watching." The computing environment can then identify items of media content based on the environmental data, and can select a particular item of media content, from among the identified items, that matches the particular content type associated with the keywords. The computing environment provides a representation of the particular item of media content to the user of the mobile computing device.

Innovative aspects of the subject matter described in this specification may be embodied in methods that include the actions of receiving (i) audio data that encodes a spoken natural language query, and (ii) environmental audio data, obtaining a transcription of the spoken natural language query, determining a particular content type associated with one or more keywords in the transcription, providing at least a portion of the environmental audio data to a content recognition engine, and identifying a content item that has been output by the content recognition engine, and that matches the particular content type.

Other embodiments of these aspects include corresponding systems, apparatus, and computer programs, configured to perform the actions of the methods, encoded on computer storage devices.

These and other embodiments may each optionally include one or more of the following features. For instance, the particular content type is a movie content type, a music content type, a television show content type, an audio podcast content type, a book content type, an artwork content type, a trailer content type, a video podcast content type, an Internet video content type, or a video game content type. Receiving the environmental audio data further includes receiving additional audio data that includes background noise. The background noise is associated with the particular content type. Receiving additional environmental data that includes video data or image data. The video data or the image data is associated with the particular content type. Providing at least the portion of the environmental audio data to the content recognition engine further includes providing the portion of the environmental audio data to an audio fingerprinting engine. Determining the particular content type further includes identifying the one or more keywords using one or more databases that, for each of multiple content types, maps at least one of the keywords to at least one of the multiple content types. The multiple content types includes the particular content type, and wherein mapping further includes mapping at least one of the keywords to the particular content type. Outputting data identifying the content item.

The features further include, for example, providing further includes providing data identifying the particular content type to the content recognition engine, and identifying the content item further includes receiving data identifying the content item from the content recognition engine. Receiving two or more content recognition candidates from the content recognition system, and identifying the content item further includes selecting a particular content recognition candidate based on the particular content type. Each of the two or more content recognition candidates is associated with a ranking score, the method further including adjusting the ranking scores of the two or more content recognition candidates based on the particular content type. Ranking the two or more content recognition candidates based on the adjusted ranking scores.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
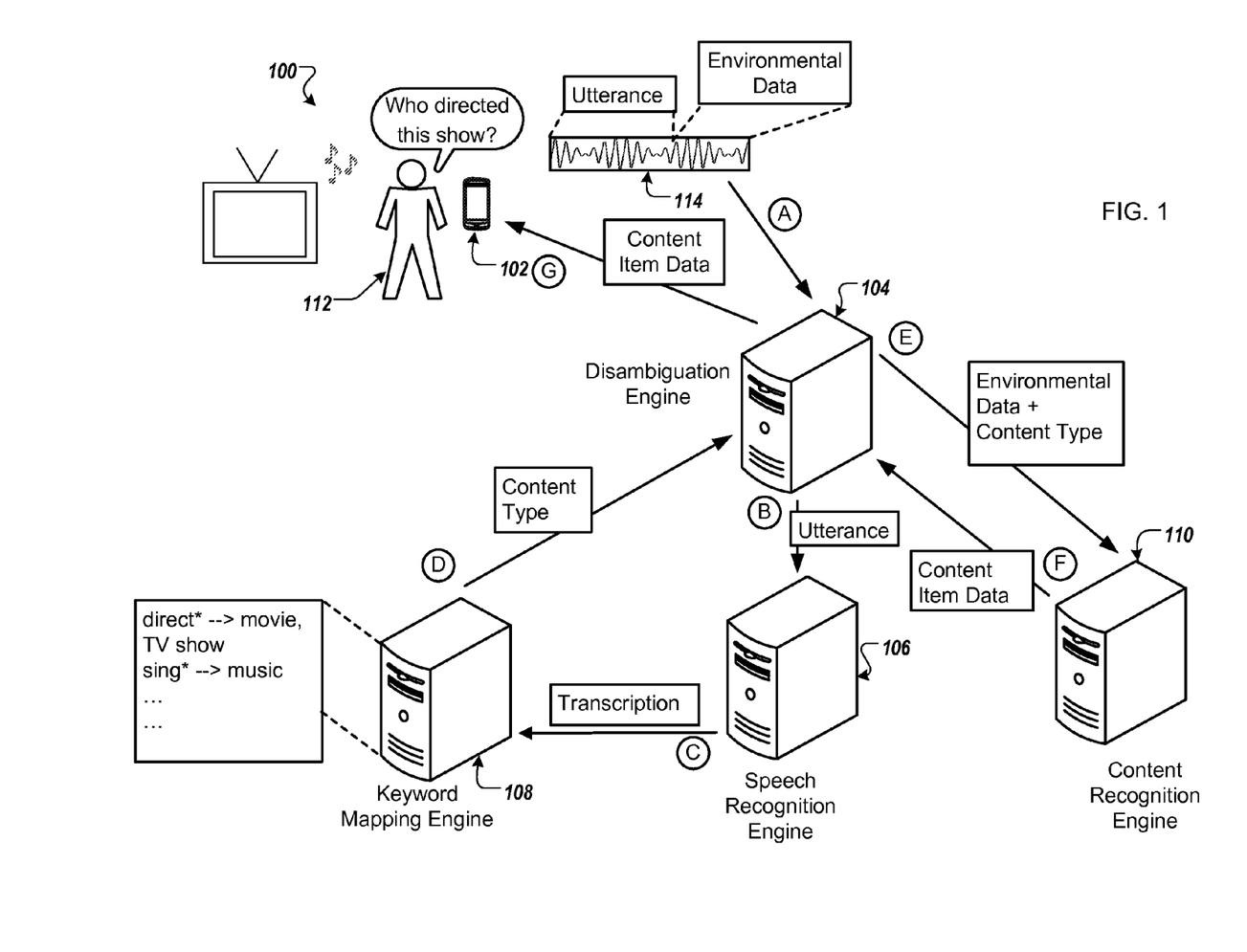
FIG. 1 depicts an example system for identifying content item data based on environmental audio data and a spoken natural language query.

FIG. 1 depicts a system 100 for identifying content item data based on environmental audio data and a spoken natural language query. Briefly, the system 100 can identify content item data that is based on the environmental audio data and that matches a particular content type associated with the spoken natural language query. The system 100 includes a mobile computing device 102, a disambiguation engine 104, a speech recognition engine 106, a keyword mapping engine 108, and a content recognition engine 110. The mobile computing device 102 is in communication with the disambiguation engine 104 over one or more networks. The mobile device 110 can include a microphone, a camera, or other detection means for detecting utterances from a user 112 and/or environmental data associated with the user 112.

In some examples, the user 112 is watching a television program. In the illustrated example, the user 112 would like to know who directed the television program that is currently playing. In some examples, the user 112 may not know the name of the television program that is currently playing, and may therefore ask the question "Who directed this show?" The mobile computing device 102 detects this utterance, as well as environmental audio data associated with the environment of the user 112.

In some examples, the environmental audio data associated with the environment of the user 112 can include background noise of the environment of the user 112. For example, the environmental audio data includes the sounds of the television program. In some examples, the environmental audio data that is associated with the currently displayed television program can include audio of the currently displayed television program (e.g., dialogue of the currently displayed television program, soundtrack audio associated with the currently displayed television program, etc.).

In some examples, the mobile computing device 102 detects the environmental audio data after detecting the utterance; detects the environmental audio data concurrently with detecting the utterance; or both. The mobile computing device 102 processes the detected utterance and the environmental audio data to generate waveform data 114 that represents the detected utterance and the environmental audio data and transmits the waveform data 114 to the disambiguation engine 104 (e.g., over a network), during operation (A). In some examples, the environmental audio data is streamed from the mobile computing device 110.

The disambiguation engine 104 receives the waveform data 114 from the mobile computing device 102. The disambiguation engine 104 processes the waveform data 114, including separating (or extracting) the utterance from other portions of the waveform data 114 and transmits the utterance to the speech recognition engine 106 (e.g., over a network), during operation (B). For example, the disambiguation engine 104 separates the utterance ("Who directed this show?") from the background noise of the environment of the user 112 (e.g., audio of the currently displayed television program).

In some examples, the disambiguation engine 104 utilizes a voice detector to facilitate separation of the utterance from the background noise by identifying a portion of the waveform data 114 that includes voice activity, or voice activity associated with the user of the computing device 102. In some examples, the utterance relates to a query (e.g., a query relating to the currently displayed television program). In some examples, the waveform data 114 includes represents the detected utterance. In response, the disambiguation engine 104 can request the environmental audio data from the mobile computing device 102 relating to the utterance.

The speech recognition engine 106 receives the portion of the waveform data 114 that corresponds to the utterance from the disambiguation engine 104. The speech recognition engine 106 obtains a transcription of the utterance and provides the transcription to the keyword mapping engine 108, during operation (C). Specifically, the speech recognition engine 106 processes the utterance received from the speech recognition engine 106. In some examples, processing of the utterance by the speech recognition system 106 includes generating a transcription of the utterance. Generating the transcription of the utterance can include transcribing the utterance into text or text-related data. In other words, the speech recognition system 106 can provide a representation of language in written form of the utterance.

For example, the speech recognition system 106 transcribes the utterance to generate the transcription of "Who directed this show?" In some embodiments, the speech recognition system 106 provides two or more transcriptions of the utterance. For example, the speech recognition system 106 transcribes the utterance to generate the transcriptions of "Who directed this show?" and "Who directed this shoe?"

The keyword mapping engine 108 receives the transcription from the speech recognition engine 106. The keyword mapping engine 108 identifies one or more keywords in the transcription that are associated with a particular content type and provides the particular content type to the disambiguation engine 104, during operation (D). In some embodiments, the one or more content types can include 'movie', 'music', 'television show', 'audio podcast', 'image,' 'artwork,' 'book,' 'magazine,' 'trailer,' 'video podcast', 'Internet video', or 'video game'.

For example, the keyword mapping engine 108 identifies the keyword "directed" from the transcription of "Who directed this show?" The keyword "directed" is associated with the 'television show' content type. In some embodiments, a keyword of the transcription that is identified by the keyword mapping engine 108 is associated with two or more content types. For example, the keyword "directed" is associated with the 'television show' and 'movie' content types.

In some embodiments, the keyword mapping engine 108 identifies two or more keywords in the transcription that are associated with a particular content type. For example, the keyword mapping engines 108 identifies the keywords "directed" and "show" that are associated with a particular content type. In some embodiments, the identified two or more keywords are associated with the same content type. For example, the identified keywords "directed" and "show" are both associated with the 'television show' content type. In some embodiments, the identified two or more keywords are associated with differing content types. For example, the identified keyword "directed" is associated with the 'movie' content type and the identified keyword "show" is associated with the 'television show' content type. The keyword mapping engine 108 transmits (e.g., over a network) the particular content type to the disambiguation engine 108.

In some embodiments, the keyword mapping engine 108 identifies the one or more keywords in the transcription that are associated with a particular content type using one or more databases that, for each of multiple content types, maps at least one of the keywords to at least one of the multiple content types. Specifically, the keyword mapping engine 108 includes (or is in communication with) a database (or multiple databases). The database includes, or is associated with, a mapping between keywords and content types. Specifically, the database provides a connection (e.g., mapping) between the keywords and the content types such that the keyword mapping engine 108 is able to identify one or more keywords in the transcription that are associated with particular content types.

In some embodiments, one or more of the mappings between the keywords and the content types can include a unidirectional (e.g., one-way) mapping (i.e., a mapping from the keywords to the content types). In some embodiments, one or more of the mappings between the keywords and the content types can include a bidirectional (e.g., two-way) mapping (i.e., a mapping from the keywords to the content types and from the content types to the keywords). In some embodiments, the one or more databases maps one or more of the keywords to two or more content types.

For example, the keyword mapping engine 108 uses the one or more databases that maps the keyword "directed" to the 'movie' and 'television show' content types. In some embodiments, the mapping between the keywords and the content types can include mappings between multiple, varying versions of a root keyword (e.g., the word family) and the content types. The differing versions of the keyword can include differing grammatical categories such as tense (e.g., past, present, future) and word class (e.g., noun, verb). For example, the database can include mappings of the word family of the root word "direct" such as "directors," "direction," and "directed" to the one or more content types.

The disambiguation engine 104 receives data identifying the particular content type associated with the transcription of the utterance from the keyword mapping engine 108. Furthermore, as mentioned above, the disambiguation engine 104 receives the waveform data 114 from the mobile computing device 102 that includes the environmental audio data associated with the utterance. The disambiguation engine 104 then provides the environmental audio data and the particular content type to the content recognition engine 110, during operation (E).

For example, the disambiguation engine 104 transmits the environmental audio data relating to the currently displayed television program that includes audio of the currently displayed television program (e.g., dialogue of the currently displayed television program, soundtrack audio associated with the currently displayed television program, etc.) and the particular content type of the transcription of the utterance (e.g., 'television show' content type) to the content recognition engine 110.

In some embodiments, the disambiguation engine 104 provides a portion of the environmental audio data to the content recognition engine 110. In some examples, the portion of the environmental audio data can include background noise detected by the mobile computing device 102 after detecting the utterance. In some examples, the portion of the environmental audio data can include background noise detected by the mobile computing device 102 concurrently with detecting the utterance.

In some embodiments, the background noise (of the waveform data 114) is associated with a particular content type that is associated with a keyword of the transcription. For example, the keyword "directed" of the transcription "Who directed this show?" is associated with the 'television show' content type, and the background noise (e.g., the environmental audio data relating to the currently displayed television program) is also associated with the 'television show' content type.

The content recognition engine 110 receives the environmental audio data and the particular content type from the disambiguation engine 104. The content recognition engine 110 identifies content item data that is based on the environmental audio data and that matches the particular content type and provides the content item data to the disambiguation engine 104, during operation (F). Specifically, the content recognition engine 110 appropriately processes the environmental audio data to identify content item data that is associated with the environmental audio data (e.g., a name of a television show, a name of a song, etc.). Additionally, the content recognition engine 110 matches the identified content item data with the particular content type (e.g., content type of the transcription of the utterance). The content recognition engine 110 transmits (e.g., over a network) the identified content item data to the disambiguation engine 104.

For example, the content recognition engine 110 identifies content item data that is based on the environmental audio data relating to the currently displayed television program, and further that matches the 'television show' content type. To that end, the content recognition engine 110 can identify content item data based on dialogue of the currently displayed television program, or soundtrack audio associated with the currently displayed television program, depending on the portion of the environmental audio data received by the content recognition engine 110.

In some embodiments, the content recognition engine 110 is an audio fingerprinting engine that utilizes content fingerprinting using wavelets to identify the content item data. Specifically, the content recognition engine 110 converts the waveform data 114 into a spectrogram. From the spectrogram, the content recognition engine 110 extracts spectral images. The spectral images can be represented as wavelets. For each of the spectral images that are extracted from the spectrogram, the content recognition engine 110 extracts the "top" wavelets based on the respective magnitudes of the wavelets. For each spectral image, the content recognition engine 110 computes a wavelet signature of the image. In some examples, the wavelet signatures is a truncated, quantized version of the wavelet decomposition of the image.

For example, to describe an m×n image with wavelets, m×n wavelets are returned without compression. Additionally, the content recognition engine 110 utilizes a subset of the wavelets that most characterize the song. Specifically, the t "top" wavelets (by magnitude) are selected, where t<<m×n. Furthermore, the content recognition engine 110 creates a compact representation of the sparse wavelet-vector described above, for example, using MinHash to compute sub-fingerprints for these sparse bit vectors.

In some examples, when the environmental audio data includes at least the soundtrack audio associated with the currently displayed television program, the content recognition engine 110 identifies content item data that is based on the soundtrack audio associated with the currently displayed television program and that also matches the 'television show' content type. Thus, in some examples, the content recognition engine 110 identifies content item data relating to a name of the currently displayed television program. For example, the content recognition engine 110 can determine that a particular content item (e.g., a specific television show) is associated with a theme song (e.g., the soundtrack audio), and that the particular content item (e.g., the specific television show) matches the particular content type (e.g., 'television show' content type). Thus, the content recognition engine 110 can identify data (e.g., the name of the specific television show) that relates to the particular content item (e.g., the currently displayed television program) that is based on the environmental audio data (e.g., the soundtrack audio), and further that matches the particular content type (e.g., 'television show' content type).

The disambiguation engine 104 receives the identified content item data from the content recognition engine 110. The disambiguation engine 104 then provides the identified content item data to the mobile computing device 102, at operation (G). For example, the disambiguation engine 104 transmits the identified content item data relating to the currently displayed television program (e.g., a name of the currently displayed television program) to the mobile computing device 102.

In some examples, one or more of the mobile computing device 102, the disambiguation engine 104, the speech recognition engine 106, the keyword mapping engine 108, and the content recognition engine 110 can be in communication with a subset (or each) of the mobile computing device 102, the disambiguation engine 104, the speech recognition engine 106, the keyword mapping engine 108, and the content recognition engine 110. In some embodiments, one or more of the disambiguation engine 104, the speech recognition engine 106, the keyword mapping engine 108, and the content recognition engine 110 can be implemented using one or more computing devices, such as one or more computing servers, a distributed computing system, or a server farm or cluster.

In some embodiments, as mentioned above, the environmental audio data is streamed from the mobile computing device 110 to the disambiguation engine 104. When the environmental audio data is streamed, the above-mentioned process (e.g., operations (A)-(H)) is performed as the environmental audio data is received by the disambiguation engine 104 (i.e., performed incrementally). In other words, as each portion of the environmental audio data is received by (e.g., streamed to) the disambiguation engine 104, operations (A)-(H) are performed iteratively until content item data is identified.

Figure 2:
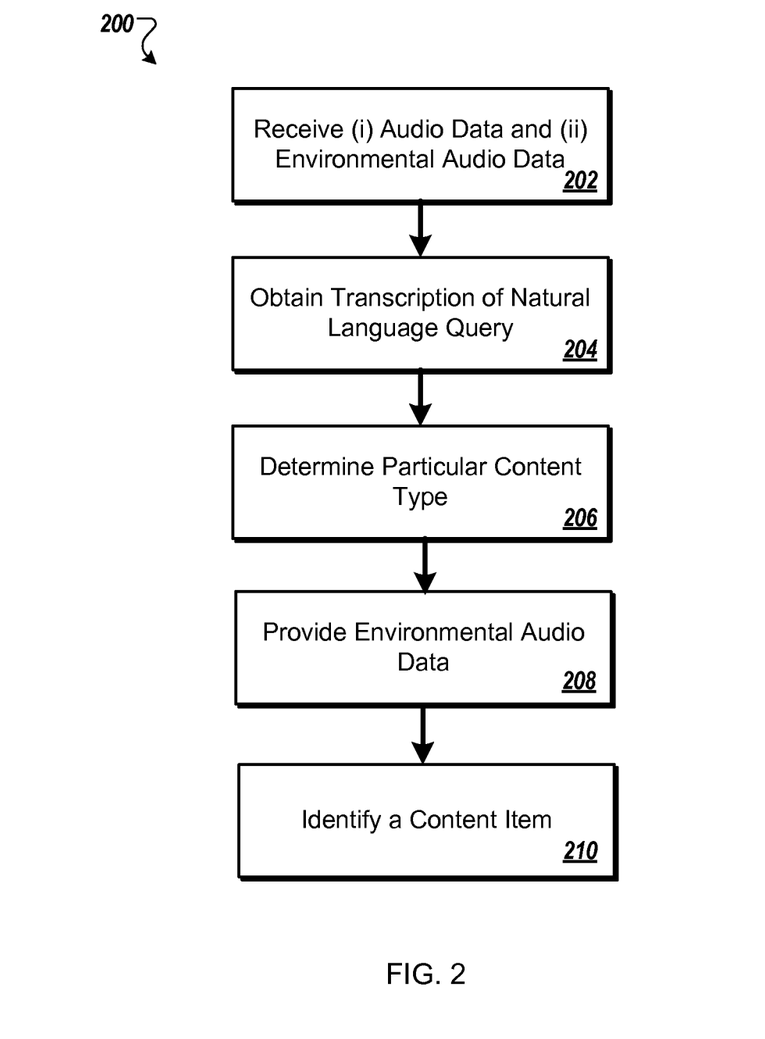
FIG. 2 depicts a flowchart for an example process for identifying content item data based on environmental audio data and a spoken natural language query.

FIG. 2 depicts a flowchart of an example process 200 for identifying content item data based on environmental audio data and a spoken natural language query. The example process 200 can be executed using one or more computing devices. For example, the mobile computing device 102, the disambiguation engine 104, the speech recognition engine 106, the keyword mapping engine 108, and/or the content recognition engine 110 can be used to execute the example process 200.

Audio data that encodes a spoken natural language query and environmental audio data is received (202). For example, the disambiguation engine 104 receives the waveform data 114 from the mobile computing device 102. The waveform data 114 includes the spoken natural query of the user (e.g., "Who directed this show?") and the environmental audio data (e.g., audio of the currently displayed television program). The disambiguation engine 104 separates the spoken natural language query ("Who directed this show?") from the background noise of the environment of the user 112 (e.g., audio of the currently displayed television program).

A transcription of the natural language query is obtained (204). For example, the speech recognition system 106 transcribes the natural language query to generate a transcription of the natural language query (e.g., "Who directed this show?").

A particular content type that is associated with one or more keywords in the transcription is determined (206). For example, the keyword mapping engine 108 identifies one or more keywords (e.g., "directed") in the transcription (e.g., "Who directed this show?") that are associated with a particular content type (e.g., 'television show' content type). In some embodiments, the keyword mapping engine 108 determines the particular content type that is associated with one or more keywords in the transcription using one or more databases that, for each of multiple content types, maps at least one of the keywords to at least one of the multiple content types. The database provides a connection (e.g., mapping) between the keywords (e.g., "directed") and the content types (e.g., 'television show' content type).

At least a portion of the environmental audio data is provided to a content recognition engine (208). For example, the disambiguation engine 104 provides at least the portion the environmental audio data encoded by the waveform data 114 (e.g., audio of the currently displayed television program) to the content recognition engine 110. In some examples, the disambiguation engine 104 also provides the particular content type (e.g. 'television show' content type) that is associated with the one or more keywords (e.g., "directed") in the transcription to the content recognition engine 110.

A content item is identified that is output by the content recognition engine, and that matches the particular content type (210). For example, the content recognition engine 110 identifies a content item or content item data that is based on the environmental audio data (e.g., audio of the currently displayed television program) and that matches the particular content type (e.g. 'television show' content type).

Figure 3A:
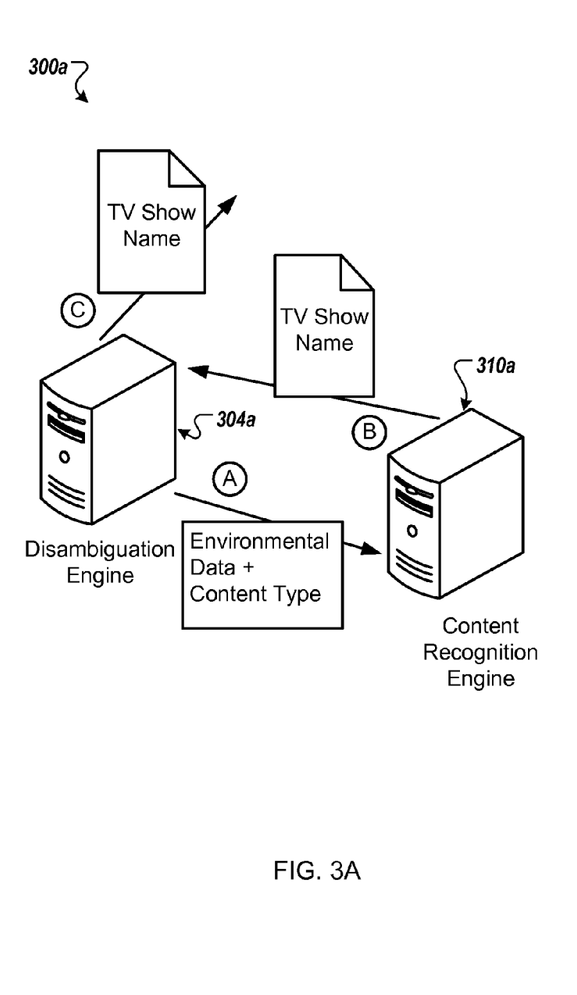
FIGS. 3A-3B depicts portions of an example system for identifying content item.
Figure 3B:
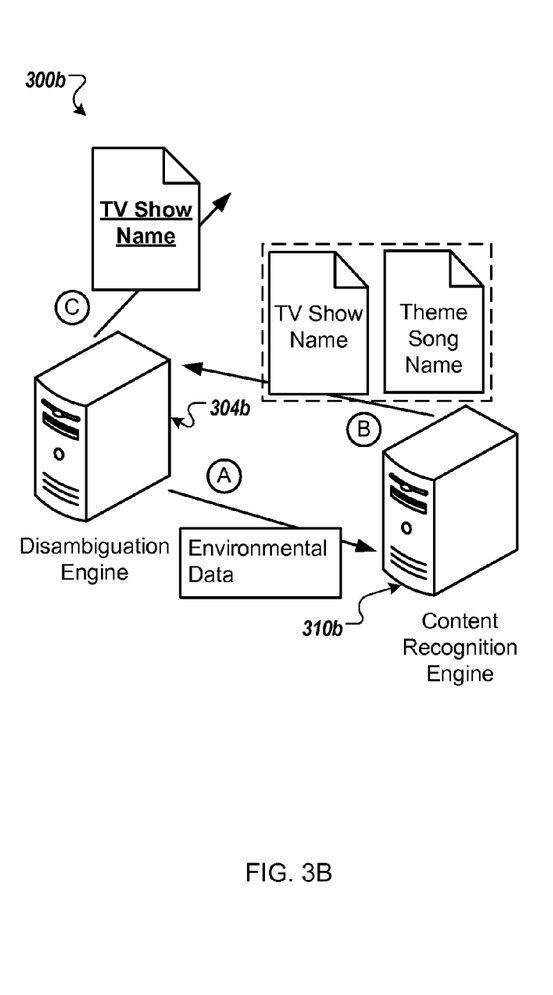

FIGS. 3A and 3B depict portions 300a and 300b, respectively, of a system for identifying content item data. Specifically, FIGS. 3A and 3B include disambiguation engines 304a and 304b, respectively; and include content recognition engines 310a and 310b, respectively. The disambiguation engines 304a and 304b are similar to the disambiguation engine 104 of system 100 depicted in FIG. 1; and the content recognition engines 310a and 310b are similar to the content recognition engine 110 of system 100 depicted in FIG. 1.

FIG. 3A depicts the portion 300a including the content recognition engine 310a. The content recognition engine 310a is able to identify content item data based on environmental data and that matches a particular content type. In other words, the content recognition engine 310a is able to appropriately process the environmental data to identify content item data based on the environmental data, and further select one or more of the identified content item data such that the selected content item data matches the particular content type.

Specifically, the disambiguation engine 304a provides the environmental data and the particular content type to the content recognition engine 310a, during operation (A). In some embodiments, the disambiguation engine 304a provides a portion of the environmental data to the content recognition engine 310a.

The content recognition engine 310a receives the environmental data and the particular content type from the disambiguation engine 304a. The content recognition engine 310a then identifies content item data that is based on the environmental data and that matches the particular content type and provides the identified content item data to the disambiguation engine 304a, during operation (B). Specifically, the content recognition engine 310a identifies content item data (e.g., a name of a television show, a name of a song, etc.) that is based on the environmental data. The content recognition engine 310a then selects one or more of the identified content item data that matches the particular content type. In other words, the content recognition engine 310a filters the identified content item data based on the particular content type. The content recognition engine 310a transmits (e.g., over a network) the identified content item data to the disambiguation engine 304a.

In some examples, when the environmental data includes at least soundtrack audio associated with a currently displayed television program, as mentioned above with respect to FIG. 1, the content recognition engine 310a identifies content item data that is based on the soundtrack audio associated with the currently displayed television program. The content recognition engine 310a then filters the identified content item data based on the 'television show' content type. For example, the content recognition engine 310a identifies a 'theme song name' and a 'TV show name' associated with the soundtrack audio. The content recognition engine 310a then filters the identified content item data such that the identified content item data also matches the 'television show' content type. For example, the content recognition engine 310a selects the 'TV show name' identifying data, and transmits the 'TV show name' identifying data to the disambiguation engine 304a.

In some examples, the content recognition engine 310a selects a corpus (or index) based on the content type (e.g., 'television show' content type). Specifically, the content recognition engine 310a can have access to a first index relating to the 'television show' content type and a second index relating to a 'movie' content type. The content recognition engine 310a appropriately selects the first index based on the 'television show' content type. Thus, by selecting the first index (and not selecting the second index), the content recognition engine 310a can more efficiently identify the content item data (e.g., a name of the television show).

The disambiguation engine 304a receives the content item data from the content recognition engine 310a. For example, the disambiguation engine 304a receives the 'TV show name' identifying data from the content recognition engine 310a. The disambiguation engine 304a then provides the identifying data to a third party (e.g., the mobile computing device 102 of FIG. 1), during operation (C). For example, the disambiguation engine 304a provides the 'TV show name' identifying data to the third party.

FIG. 3b depicts the portion 300b including the content recognition engine 310b. The content recognition engine 310b is able to identify content item data based on environmental data. In other words, the content recognition engine 310b is able to appropriately process the environmental data to identify content item data based on the environmental data, and provide the content item data to the disambiguation engine 304b. The disambiguation engine 310b selects one or more of the identified content item data such that the selected content item data matches the particular content type.

Specifically, the disambiguation engine 304b provides the environmental data to the content recognition engine 310b, during operation (A). In some embodiments, the disambiguation engine 304b provides a portion of the environmental data to the content recognition engine 310b.

The content recognition engine 310b receives the environmental data from the disambiguation engine 304b. The content recognition engine 310b then identifies content item data that is based on the environmental data and provides the identified content item data to the disambiguation engine 304b, during operation (B). Specifically, the content recognition engine 310b identifies content item data associated with two or more content items (e.g., a name of a television show, a name of a song, etc.) that is based on the environmental data. The content recognition engine 310b transmits (e.g., over a network) two or more candidates representing the identified content item data to the disambiguation engine 304b.

In some examples, when the environmental data includes at least soundtrack audio associated with a currently displayed television program, as mentioned above with respect to FIG. 1, the content recognition engine 310b identifies content item data relating to two or more content items that is based on the soundtrack audio associated with the currently displayed television program. For example, the content recognition engine 310b identifies a 'theme song name' and a 'TV show name' associated with the soundtrack audio, and transmits the 'theme song name' and 'TV show name' identifying data to the disambiguation engine 304b.

The disambiguation engine 304b receives the two or more candidates from the content recognition engine 310b. For example, the disambiguation engine 304b receives the 'theme song name' and 'TV show name' candidates from the content recognition engine 310b. The disambiguation engine 304b then selects one of the two or more candidates based on a particular content type and provides the selected candidate to a third party (e.g., the mobile computing device 102 of FIG. 1), during operation (C). Specifically, the disambiguation engine 304b previously receives the particular content type (e.g., that is associated with an utterance), as described above with respect to FIG. 1. The disambiguation engine 304b selects a particular candidate of the two or more candidates based on the particular content type. Specifically, the disambiguation engine 304b selects the particular candidate of the two or more candidates that matches the particular content type. For example, the disambiguation engine 304b selects the 'TV show name' candidate as the 'TV show name' candidate matches the 'television show' content type.

In some embodiments, the two or more candidates from the content recognition engine 310b are associated with a ranking score. The ranking score can be associated with any scoring metric as determined by the disambiguation engine 304b. The disambiguation engine 304b can further adjust the ranking score of two or more candidates based on the particular content type. Specifically, the disambiguation engine 304b can increase the ranking score of one or more of the candidates when the respective candidates are matched to the particular content type. For example, the ranking score of the candidate 'TV show name' can be increased as it matches the 'television show' content type. Furthermore, the disambiguation engine 304b can decrease the ranking score of one or more of the candidates when the respective candidates are not matched to the particular content type. For example, the ranking score of the candidate 'theme song name' can be decreased as it does not match the 'television show' content type.

In some embodiments, the two or more candidates can be ranked based on the respective adjusted ranking scores by the disambiguation engine 304b. For example, the disambiguation engine 304b can rank the 'TV show name' candidate above the 'theme song name' candidate as the 'TV show name' candidate has a higher adjusted ranking score as compared to the adjusted ranking score of the 'theme song name' candidate. In some examples, the disambiguation engine 304b selects the candidate ranked highest (i.e., has the highest adjusted ranking score).

Figure 4:
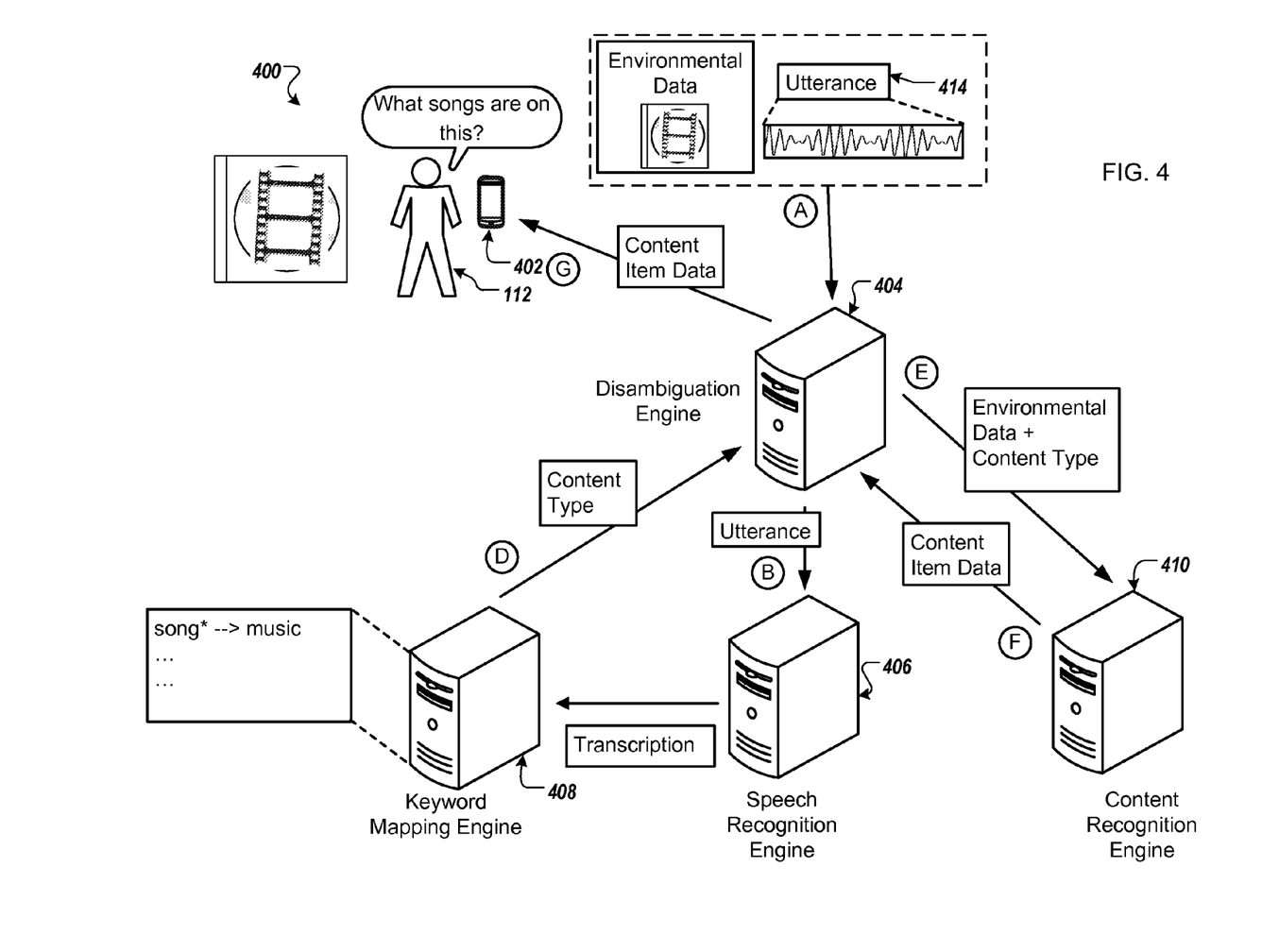
FIG. 4 depicts an example system for identifying media content items based on environmental image data and a spoken natural language query.

FIG. 4 depicts a system 400 for identifying content item data based on environmental image data and a spoken natural language query. In short, the system 400 can identify content item data that is based on the environmental image data and that matches a particular content type associated with the spoken natural language query. The system 400 includes a mobile computing device 402, a disambiguation engine 404, a speech recognition engine 406, a keyword mapping engine 408, and a content recognition engine 410, analogous to that of the mobile computing device 102, the disambiguation engine 104, the speech recognition engine 106, the keyword mapping engine 108, and the content recognition engine 110, respectively, of system 100 illustrated in FIG. 1.

In some examples, the user 112 is looking at a CD album cover of a soundtrack of a movie. In the illustrated example, the user 112 would like to know what songs are on the soundtrack. In some examples, the user 112 may not know the name of the movie soundtrack, and may therefore ask the question "What songs are on this?" or "What songs play in this movie?" The mobile computing device 402 detects this utterance, as well as environmental image data associated with the environment of the user 112.

In some examples, the environmental image data associated with the environment of the user 112 can include image data of the environment of the user 112. For example, the environmental image data includes an image of the CD album cover that depicts images related to the movie (e.g., an image of a movie poster of the associated movie). In some examples, the mobile computing device 402 detects the environmental image data utilizing a camera of the mobile computing device 402 that captures an image (or video) of the CD album cover.

The mobile computing device 402 processes the detected utterance to generate waveform data 414 that represents the detected utterance and transmits the waveform data 414 and the environmental image data to the disambiguation engine 404 (e.g., over a network), during operation (A).

The disambiguation engine 404 receives the waveform data 414 and the environmental image data from the mobile computing device 402. The disambiguation engine 404 processes the waveform data 414 and transmits the utterance to the speech recognition engine 406 (e.g., over a network), during operation (B). In some examples, the utterance relates to a query (e.g., a query relating to the movie soundtrack).

The speech recognition system 406 receives the utterance from the disambiguation engine 404. The speech recognition system 406 obtains a transcription of the utterance and provides the transcription to the keyword mapping engine 408, during operation (C). Specifically, the speech recognition system 406 processes the utterance received from the speech recognition engine 406 by generating a transcription of the utterance.

For example, the speech recognition system 406 transcribes the utterance to generate the transcription of "What songs are on this?" In some embodiments, the speech recognition system 406 provides two or more transcriptions of the utterance. For example, the speech recognition system 406 transcribes the utterance to generate the transcriptions of "What songs are on this?" and "What sinks are on this?"

The keyword mapping engine 408 receives the transcription from the speech recognition engine 406. The keyword mapping engine 408 identifies one or more keywords in the transcription that are associated with a particular content type and provides the particular content type to the disambiguation engine 404, during operation (D).

For example, the keyword mapping engine 408 identifies the keyword "songs" from the transcription of "What songs are on this?" The keyword "songs" is associated with the 'music' content type. In some embodiments, a keyword of the transcription that is identified by the keyword mapping engine 408 is associated with two or more content types. For example, the keyword "songs" is associated with the 'music' and 'singer' content types. The keyword mapping engine 408 transmits (e.g., over a network) the particular content type to the disambiguation engine 408.

In some embodiments, analogous to that mentioned above, the keyword mapping engine 408 identifies the one or more keywords in the transcription that are associated with a particular content type using one or more databases that, for each of multiple content types, maps at least one of the keywords to at least one of the multiple content types. For example, the keyword mapping engine 408 uses the one or more databases that maps the keyword "songs" to the 'music' and 'singer' content types.

The disambiguation engine 404 receives the particular content type associated with the transcription of the utterance from the keyword mapping engine 408. Furthermore, as mentioned above, the disambiguation engine 404 receives the environmental image data associated with the utterance. The disambiguation engine 404 then provides the environmental image data and the particular content type to the content recognition engine 410, during operation (E).

For example, the disambiguation engine 404 transmits the environmental image data relating to the movie soundtrack (e.g., an image of the movie poster CD album cover) and the particular content type of the transcription of the utterance (e.g., 'music' content type) to the content recognition engine 410.

The content recognition engine 410 receives the environmental image data and the particular content type from the disambiguation engine 404. The content recognition engine 410 then identifies content item data that is based on the environmental image data and that matches the particular content type and provides the identified content item data to the disambiguation engine 404, during operation (F). Specifically, the content recognition engine 410 appropriately processes the environmental image data to identify content item data (e.g., a name of a content item). Additionally, the content recognition engine 410 matches the identified content item with the particular content type (e.g., content type of the transcription of the utterance). The content recognition engine 408 transmits (e.g., over a network) the identified content item data to the disambiguation engine 408.

For example, the content recognition engine 410 identifies data that is based on the environmental image data relating to the image of the movie poster CD album cover, and further that matches the 'music' content type.

In some examples, when the environmental image data includes at least the movie poster image associated with the CD album cover, the content recognition engine 410 identifies content item data that is based on the movie poster associated with the CD album cover and that also matches the 'music' content type. Thus, in some examples, the content recognition engine 410 identifies content item data relating to a name of the movie soundtrack. For example, the content recognition engine 410 can determine that a particular content item (e.g., a specific movie soundtrack) is associated with a movie poster, and that the particular content item (e.g., the specific movie soundtrack) matches the particular content type (e.g., 'music' content type). Thus, the content recognition 410 can identify data (e.g., the name of the specific movie soundtrack) that relates to the particular content item (e.g., the specific movie soundtrack) that is based on the environmental image data (e.g., the image of the CD album cover), and further that matches the particular content type (e.g., 'music' content type).

The disambiguation engine 404 receives the identified content item data from the content recognition engine 410. The disambiguation engine 404 then provides the identified content item data to the mobile computing device 402, at operation (G). For example, the disambiguation engine 404 transmits the identified content item data relating to the movie soundtrack (e.g., a name of the movie soundtrack) to the mobile computing device 402.

Figure 5:
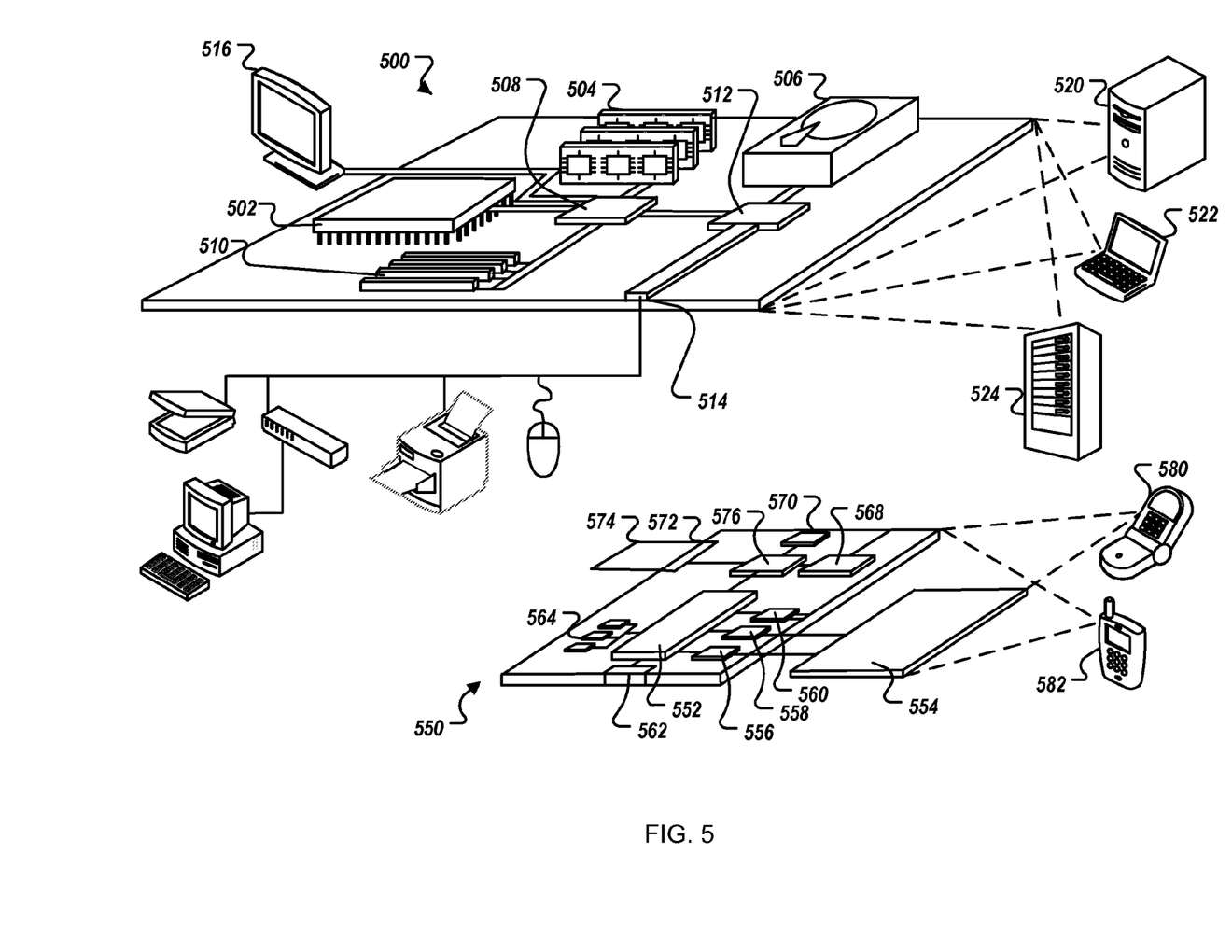
FIG. 5 depicts a computer device and a mobile computer device that may be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 650, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 658 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
   receiving, by one or more processors, audio data that encodes (i) a spoken natural language query, and (ii) music;
   determining, by the one or more processors, that one or more keywords in a transcription of the spoken natural language query are associated with a movie content type; and
   based on determining that the one or more keywords in the transcription of the spoken natural query are associated with the movie content type, identifying, by the one or more processors, a movie content item that is recognized using the music.

2. The computer-implemented method of claim 1, wherein receiving the audio data further comprises receiving the audio data from a mobile computing device.

3. The computer-implemented method of claim 2, wherein receiving the audio data further comprises receiving environmental audio data associated with the mobile computing device.

4. The computer-implemented method of claim 1, wherein the audio data that encodes the music is generated within a predetermined period of time before receiving the audio data that encodes the spoken natural language query.

5. The computer-implemented method of claim 1, wherein determining that the one or more keywords in the transcription of the spoken natural language query are associated with the movie content type further includes identifying the one or more keywords using one or more databases that map at least one of the keywords to the movie content type.

6. A computer-readable medium storing software comprising instructions executable by one or more computers which, upon such execution, cause the one or more computers to perform operations comprising:
   receiving, by one or more processors, (i) an image or a video, and (ii) audio data that encodes a spoken natural language query;
   determining, by the one or more processors, that one or more keywords in a transcription of the spoken natural language query are associated with a music content type; and
   based on determining that the one or more keywords in the transcription of the spoken natural query are associated with the music content type, identifying, by the one or more processors, a music content item that is recognized using the image or the video.

7. The computer-readable medium of claim 6, wherein receiving (i) the image or the video and (ii) the data that encodes the spoken natural language query further comprises receiving the (i) the image or the video and the (ii) the audio data that encodes the spoken natural language query from a mobile computing device.

8. The computer-readable medium of claim 6, wherein the image or the video is generated within a predetermined period of time before receiving the audio data that encodes the spoken natural language query.

9. The computer-readable medium of claim 6, wherein determining that the one or more keywords in the transcription of the spoken natural language query are associated with the music content type further includes identifying the one or more keywords using one or more databases that map at least one of the keywords to the music content type.

10. The computer-readable medium of claim 7, wherein receiving the image or the video further comprises receiving an environmental image or video associated with the mobile computing device.

11. A system comprising:
    one or more computers and one or more storage devices storing instructions that are operable, when executed by the one or more computers, to cause the one or more computers to perform operations comprising:
       receiving, by one or more processors, audio data that encodes (i) a spoken natural language query and (ii) music;
       determining, by the one or more processors, that one or more keywords in a transcription of the spoken natural language query are associated with a movie content type; and
       based on determining that the one or more keywords in the transcription of the spoken natural query are associated with the movie content type, identifying, by the one or more processors, a movie content item that is recognized using the music.

12. The system of claim 11, wherein receiving the audio data further comprises receiving the audio data from a mobile computing device.

13. The system of claim 11, wherein the audio data that encodes the music is generated within a predetermined period of time before receiving the audio data that encodes the spoken natural language query.

14. The system of claim 11, wherein determining that the one or more keywords in the transcription of the spoken natural language query are associated with the movie content type further includes identifying the one or more keywords using one or more databases that map at least one of the keywords to the movie content type.

15. The system of claim 12, wherein receiving the audio data further comprises receiving environmental audio data associated with the mobile computing device.

* * * * *